(12) United States Patent
Gould

(10) Patent No.: US 10,659,426 B2
(45) Date of Patent: May 19, 2020

(54) SYSTEM AND METHOD FOR DOMAIN NAME SYSTEM USING A POOL MANAGEMENT SERVICE

(71) Applicant: VERISIGN, INC., Reston, VA (US)

(72) Inventor: James Gould, Leesburg, VA (US)

(73) Assignee: VERISIGN, INC., Reston, VA (US)

( * ) Notice: Subject to any disclaimer, the term of this patent is extended or adjusted under 35 U.S.C. 154(b) by 238 days.

(21) Appl. No.: 15/606,530

(22) Filed: May 26, 2017

(65) Prior Publication Data

US 2018/0343230 A1   Nov. 29, 2018

(51) Int. Cl.
*H04L 29/12* (2006.01)
*H04L 12/24* (2006.01)
*H04L 29/06* (2006.01)

(52) U.S. Cl.
CPC ...... *H04L 61/1511* (2013.01); *H04L 41/0893* (2013.01); *H04L 61/302* (2013.01); *H04L 69/16* (2013.01)

(58) Field of Classification Search
CPC . H04L 41/0893; H04L 61/1511; H04L 61/302
See application file for complete search history.

(56) References Cited

U.S. PATENT DOCUMENTS

| | | | | |
|---|---|---|---|---|
| 6,249,883 | B1* | 6/2001 | Cassidy | G06F 11/008 714/42 |
| 2002/0091827 | A1* | 7/2002 | King | G06Q 40/04 709/226 |
| 2002/0101826 | A1* | 8/2002 | Giacopelli | H04L 41/0893 370/252 |
| 2002/0129013 | A1* | 9/2002 | Thomas | H04L 43/04 |

(Continued)

FOREIGN PATENT DOCUMENTS

| | | |
|---|---|---|
| EP | 2 779 586 A1 | 9/2014 |
| EP | 3 209 002 A1 | 8/2017 |
| WO | 2008/031215 A1 | 3/2008 |

OTHER PUBLICATIONS

Hollenbeck, et al., "Extensible Provisioning Protocol (EPP) Transport Over TCP"; Internet Engineering Task Force (IETF), (May 1, 2007), pp. 1-10. XP015052470.

(Continued)

*Primary Examiner* — Mohamed A. Wasel

(74) *Attorney, Agent, or Firm* — MH2 Technology Law Group, LLP

(57) ABSTRACT

A method and a system and computer readable medium configured to perform and store the method for providing domain registry services is provided. The method includes receiving, at a domain registry comprising at least one electronic server computer, a first domain request from a registrar, wherein the first domain request comprises a first extensible provisioning protocol ("EPP") command to perform a first action on a first domain name associated with a first pool of network resources; accessing, by at least one electronic processor, an electronically stored first policy, wherein the first policy comprises connection and throughput parameters for the registrar to access the first pool of network resources; applying, by at least one electronic processor, the first policy to the first domain name request; and providing, by at least one electronic processor, a first response to the first domain request.

20 Claims, 6 Drawing Sheets

(56) References Cited

U.S. PATENT DOCUMENTS

| | | | |
|---|---|---|---|
| 2003/0225865 A1* | 12/2003 | Koestler | G06F 11/3006 |
| | | | 709/220 |
| 2004/0167982 A1 | 8/2004 | Cohen et al. | |
| 2007/0300061 A1* | 12/2007 | Kim | G06F 21/56 |
| | | | 713/164 |
| 2013/0173497 A1* | 7/2013 | Gould | H04L 61/302 |
| | | | 705/400 |
| 2015/0134832 A1* | 5/2015 | Gould | H04L 61/1511 |
| | | | 709/226 |
| 2016/0119282 A1* | 4/2016 | Bladel | H04L 61/302 |
| | | | 709/203 |
| 2017/0180490 A1* | 6/2017 | Kamdar | H04L 67/18 |
| 2017/0187673 A1* | 6/2017 | Kaliski, Jr. | H04L 61/1511 |
| 2017/0317973 A1* | 11/2017 | Lam | H04L 61/1511 |
| 2018/0063078 A1* | 3/2018 | Gould | G06Q 30/06 |
| 2018/0262444 A1* | 9/2018 | Blinn | G06F 16/248 |

OTHER PUBLICATIONS

Extended European Search Report dated Oct. 1, 2018, EP Application No. 18 17 4299.0, pp. 1-8.

* cited by examiner

SYSTEM AND METHOD FOR DOMAIN NAME SYSTEM USING A POOL MANAGEMENT SERVICE

FIELD

The present disclosure relates generally to domain name system ("DNS") using a pool management service.

BACKGROUND

As Internet usage grows exponentially, the demand for Internet-related services is also growing rapidly. As a result of the increased usage of the Internet, the demand for domain names also increases. Consequently, demand for domain-related services is also on the rise. Such domain-related services can include domain name creation, domain name registration renewal, and the like. Typically, a website serves as a primary vehicle for establishing an online presence for a domain name. To meet this ever increasing demand for domain name-related services, it is necessary that the entities that provide these services do so in an efficient and cost-effective manner.

The DNS is the part of the Internet infrastructure that translates human-readable domain names into the Internet Protocol ("IP") numbers needed to establish Transmission Control Protocol ("TCP")/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (e.g., labels) separated by dots. The right-most label in a domain name is known as the top-level domain ("TLD"). Examples of well-known TLDs include .com, .net, .org, .edu, and .gov. Additional examples of TLDs include .biz, .info, and .name. Each TLD supports second-level domains, listed immediately to the left of the TLD, e.g., the "example" level in "www.example.com". Each second-level domain can include a number of third-level domains located immediately to the left of the second-level domain, e.g. the "www" level in www.example.com. The DNS registration system has also evolved to incorporate various country code TLDs ("ccTLDs"), each one reserved for use by a particular country, such as, .ca, .cn, and .us, associated with Canada, China, and the United States, respectively. The DNS and domain name registration system have also evolved to allow the use of alternative character sets to accommodate foreign languages.

The responsibility for operating each TLD, including maintaining a registry of the second-level domains within the TLD, is delegated to a particular organization, known as a domain name registry ("registry"). The registry is primarily responsible for answering queries for IP addresses associated with domains ("resolving"), typically through DNS servers that maintain such information in large databases, and operating its top-level domain. For most TLDs, in order to obtain a domain name, that domain name has to be registered with a registry through a DNS registrar, an entity authorized to register Internet domain names on behalf of end-users. Alternatively, an end-user can register a domain name indirectly through one or more layers of resellers. A registry may receive registrations from hundreds of registrars.

A registrar usually has a dedicated service connection with the registries in order to access domain-related services, e.g., domain name creation or renewal. Registrars typically use the Extensible Provisioning Protocol ("EPP") as a vehicle to communicate with the registries in order to register or renew domain names. EPP is a protocol designed for allocating objects within registries over the Internet. The EPP protocol is based on Extensible Markup Language ("XML"), which is a structured, text-based format. The underlying network transport is not fixed, although the currently specified method is over TCP.

SUMMARY

According to examples of the present disclosure, a method for providing domain registry services is provided. The method comprises receiving, at a domain registry comprising at least one electronic server computer, a first domain request from a registrar, wherein the first domain request comprises a first extensible provisioning protocol ("EPP") command to perform a first action on a first domain name associated with a first pool of network resources; accessing, by at least one electronic processor, an electronically stored first policy, wherein the first policy comprises connection and throughput parameters for the registrar to access the first pool of network resources; applying, by at least one electronic processor, the first policy to the first domain name request; and providing, by at least one electronic processor, a first response to the first domain request.

In some examples, the method can further comprise receiving, at the domain registry, a second domain request from the registrar, wherein the second domain request comprises a second EPP command to perform a second action on a second domain name associated with a second pool of network resources; accessing a second policy, wherein the second policy comprises connection and throughput parameters that are different than the first policy for the registrar to access the second pool of network resources; applying the second policy to the second domain request; and providing a second response to the second domain request.

In some examples, the first domain request is accepted, throttled, or rejected based on the first policy that is applied.

In some examples, the accessing comprises loading a policy file from a pool management service, wherein the policy file comprises the first policy, the second policy, or both the first policy and the second policy.

In some examples, the method can further comprise adapting the first policy file to a configuration to be used by a network layer of the first pool of network resources.

In some examples, the method can further comprise applying the policy with the use of a remote interface or API.

In some examples, wherein the first pool of network resources are configured to provide equivalent or premium access to registrars.

In some examples, the connection and throughput parameters comprise one or more of: maximum connections, maximum transaction, maximum bandwidth, connections per account, transactions per account, connections per slot, transactions per slot, bandwidth per slot, and bandwidth per account.

In some examples, the first policy is based on one or more slots, wherein the connection and throughput parameters comprise a number of connections, a bandwidth allocation and/or a transaction throughput allocation.

According to examples of the present disclosure, the method can be performed by a system comprising at least one processor and a computer-readable medium that stores instruction to perform the method described herein.

It is to be understood that both the foregoing general description and the following detailed description are exemplary and explanatory only and are not restrictive of the implementations, as claimed.

DETAILED DESCRIPTION

Figure 1:
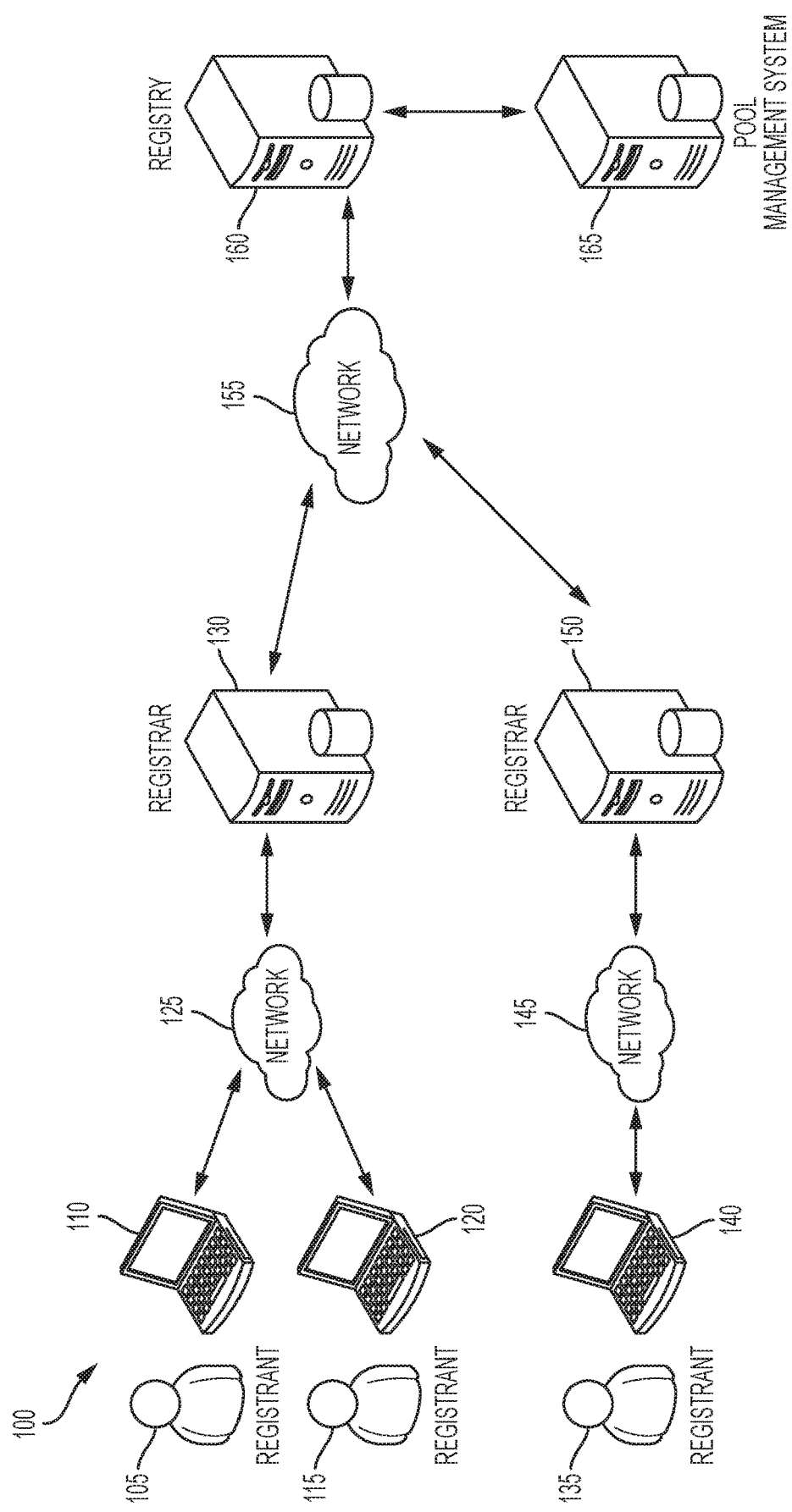
FIG. 1 is a diagram illustrating an example domain registry using a pool management system, according to examples of the present disclosure.

Reference will now be made in detail to example implementations, which are illustrated in the accompanying drawings. When appropriate, the same reference numbers are used throughout the drawings to refer to the same or like parts.

For simplicity and illustrative purposes, the principles of the present disclosure are described by referring mainly to exemplary implementations thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary implementations. Electrical, mechanical, logical and structural changes may be made to the exemplary implementations without departing from the spirit and scope of the present disclosure. The following detailed description is, therefore, not to be taken in a limiting sense and the scope of the present disclosure is defined by the appended claims and their equivalents.

According to examples of the present disclosure, a service to fully manage and automate Access Control Lists (ACLs), connection policy, and bandwidth/transaction policy on a per network pool and per registrar basis is provided that link to the systems and registrars, and that support allocation of pool slots to customize and monetize access to the pools. Today systems may have different levels of automation of managing network access (ACL, connection, bandwidth/transaction policies), but without treating the network pools as first class entities that can be managed in a similar manner to accounts, products, and subscriptions, it will be challenging to provide for a reliable network policy that can support customized and monetized access. As known in the art, a first class entity is an entity that can be dynamically created, destroyed, passed to a function, returned as a value, and have all the rights as other variables in the programming language have. Depending on the language, this can imply one or more of the following: being expressible as an anonymous literal value; being storable in variables; being storable in data structures; having an intrinsic identity (independent of any given name); being comparable for equality with other entities; being passable as a parameter to a procedure/function; being returnable as the result of a procedure/function; being constructible at runtime; being printable; being readable; being transmissible among distributed processes; and being storable outside running processes.

According to examples of the present disclosure, management of network policies is elevated to a layer that links with the remainder of the account and system entities to produce pool policy descriptors that can be adapted to the concrete network components (load balancers, packet shapers, gateways, etc.). This layer is a separate service, called the "Pool Management Service", that can treat the network pools as managed entities by non-network Subject Matter Experts (SMEs) users like Product Managers. The policies for the pools can be centrally managed and pushed out to the network devices using a common policy file format. The service may support the following pool policies: (1) equivalent access policy based on account to system subscriptions; (2) equivalent access policy overrides to handle exceptional cases like elevated access for high demand periods, e.g., advertisements by registrars during the Super Bowl; and (3) ability to extend or replace the equivalent access policy with allocated pool slots that may be purchased.

A data model is provided herein for a service that can elevate the management of system network pools to support different network policies (equivalent, differential, monetized) by non-network SMEs that link with the account, system, product, and subscription data model, with the use of a common pool policy descriptor file that can be used to automate the application of the policies to the network devices.

Conventionally, the generation of the ACLs for the systems is automated based on the system and account product subscriptions that includes additional registrar (client) tags that is used by the networking team to apply to the load balancers. Networking leverages the generated ACL file to inject the connection and bandwidth policies to the packet shaper devices. There is no formal definition of the network pools at the application layer, meaning that there is no visibility or method to manage the policies centrally by the system owners. By elevating the visibility and the management of the pools, system owners can explicitly provide the pool specific policies and incorporate exceptional and monetized access to the pools.

Aspects in accordance with the present disclosure include one or more of the following. First, a data model is provided that captures the critical pool policies that link to the existing account, system, product, subscription, and IP range data model. The data model supports the various pool policies that may be needed generically but do specially apply to domain registry systems. Second, pool slots are provided that links additional pool access to an account that can be monetized. Pool slots can be purchased by the accounts (registrars) to get additional access as opposed to creating additional accreditations for additional access based on an equivalent access policy. Third, a single pool policy file is provided that captures ACL, connection, and bandwidth or transaction policies that can be the basis for applying to the network devices.

Pool policies can be provided by the system owners to capture the pool policies in a common pool policy file format, and to automate the application of the pool policy to the network devices by using adapters that use the pool policy file format as input. Examples of the present disclosure provide for the lowering of the risk of applying network pool policies with the use of an end-to-end traceable model of policies at the application layer to the network devices, the visibility and manageability of the pool policies by the system owners directly, the support exception access by formally defining the overrides, and the support monetized access to pools with the use of pool slots. Overall, the present disclosure provides for management of the pools at the application layer for system users to provide equal, differential, and monetized access to the network pools.

In general, network pools are managed by a network team with pool policies like ACL, connections per client, bandwidth per client or transactions (TPS) per client, and overall pool policies (maximum bandwidth). Network pools are provided herein that can be managed by system owners and not through a layer of Subject Matter Experts (SMEs) like the network team. Network pools as provided herein are first class entities with the remainder of the account, product, and subscription entities. This supports creating a robust and reliable data model that reflects what is needed by the environment to support the provided network policies. A pool policy file is provided that contains the pool policy attributes that can be applied across the various network devices, e.g., load balancers, packet shapers, gateways, etc. Multiple pool policies are provided including equivalent access, differentiated access, and monetized access. In some examples, the pool management service can interact with an interface like a network as a service to apply the policies instead of producing a pool policy file that is consumed and adapted by the network.

Examples of the present disclosure presents the data model, presents the concept of a pool policy file, and presents process for fully manage and automate the pool policies for systems. This can be of particular importance to domain name registries, where drop catching activity may require creation of a separate network pool (e.g. Batch Pool) to accept competitive requests by clients while the domains are deleting from the registry.

Generally speaking, examples of the present disclosure address problems of the conventional approach by decreasing the load on the registry database and increases connection stability by registrars by using a pool management service that can provide a policy file that provides connection parameters for registrars. As used herein, a pool is a set of computing resources in communication with a common database. A registry can maintain separate pools that provide different connection capabilities for different registrars. In this case, one pool can be termed a "regular" pool and another pool can be termed an "auto" pool. In one example, a regular pool can be used by registrars to perform traditional domain registry operations on DNS provisioned objects, as defined in at least RFC 5731—Extensible Provisioning Protocol (EPP) Domain Name Mapping. For simplicity, but without limitation, the DNS provisioned object(s) will be referred to as domain name(s). The traditional domain registry operations include, but are not limited to, create, delete, renew, update, etc. An auto pool can be used to provide equivalent access to registrars similar to the regular pool or can provide priority access, e.g., paid access, which would provide paying registrars with more access to the registry, e.g., additional connections and/or transactions, increased bandwidth, etc. In one example, the auto pool can be used to provide support for drop catching. The auto pool can allow for a more efficient handling of the drop catch load without directly impacting the domain registry database. By supporting independent availability policies for registrars, the impact on the domain registry database can be reduced for the regular pool. During operations, the domain registry database receives requests from either the regular pool or auto pool, but the connection and bandwidth load of the auto pool is separated from the regular pool. Thus, the regular pool operations are isolated from the auto pool operations.

FIG. 1 is a diagram 100 illustrating an example domain registry using a pool management system according to examples of the present disclosure. Registrants 105, 115 via a respective client device 110, 120, communicates with a registrar 130 via a network 125 to register a domain name or modify properties associated with an existing domain name. Similarly, registrant 135, via client device 140, communicates with registrar 150 via a network 145. Registrars 130, 150 can communicate with a domain registry using EPP commands, discussed further below, via a network 155. A pool management system 165, which is configured to provide the pool management service discussed further below, communicates with the domain registry 160 to provide, among other things, one or more policy files that have one or more policy that the domain registry 160 uses to manage connection parameters for the registrants 105, 115 use to connect to a pool through a registry network layer. The pool policies are provisioned by the pool management service. In some examples, the implementation of the policies is provided by network adapter(s) through the one or more policy files or by passing the pool policy information to a network provided interface or API.

Networks 125, 145, and 155 can represent any type of one or more wired and/or wireless telecommunications networks. For example, networks 125, 145, and 155 can represent the Internet and/or one or more telephone networks, one or more cellular networks, one or more LANs, etc. In some implementations, client devices 110, 120, 140 can by any type of computing device that can communicate with the registrar 130, 150.

In some examples, the domain registry 160 can represent one or more computing devices. For example, the domain registry 160 can represent one or more database servers, web servers, mainframe computers, etc. used to provide a domain name registry service. In some examples, the domain registry 160 can maintain an up-to-date database of domain name records. Accordingly, the domain registry 160 can receive requests (e.g., domain names) and provide responses (e.g., IP addresses). In further examples, the domain registry 160 can delete expiring domain name records and register new domain names when no record exists for a domain name in an add request.

In some examples, the registrars 130 and 150 can each represent one or more computing devices. For example, the registrars 130 and 150 can represent database servers, web servers, mainframe computers, etc. used to provide domain name registrar services. In some examples, a registrar can be accredited by a registry (e.g., the domain registry 160) and/or ICANN to manage the reservation of domain names with the registry. Accordingly, a registrar can receive requests to register domain names from end users (e.g., registrant 105, 115, 135), and send add requests to the registry to attempt to register the domain names. Additionally, in some examples, the registrars 130 and 150 can offer a service of registering newly deleted domain names. Accordingly, when end users request an expiring domain name, the registrars 130 and 150 can send repeated add requests to the domain registry 160 in an attempt to capture the domain name.

The schematic depicted in FIG. 1 is merely for the purpose of illustration and is not intended to be limiting. Further, the domain registry depicted is merely a simplified example of a domain registry, consistent with certain disclosed examples, but such an example is not intended to be limiting. For example, the domain registry can include additional networks, servers, computers, registries, registrars, resource allocation servers, and/or other devices. Additionally, the described devices can be separate devices, as pictured, or various devices can be combined, consistent with certain disclosed embodiments.

Figure 2:
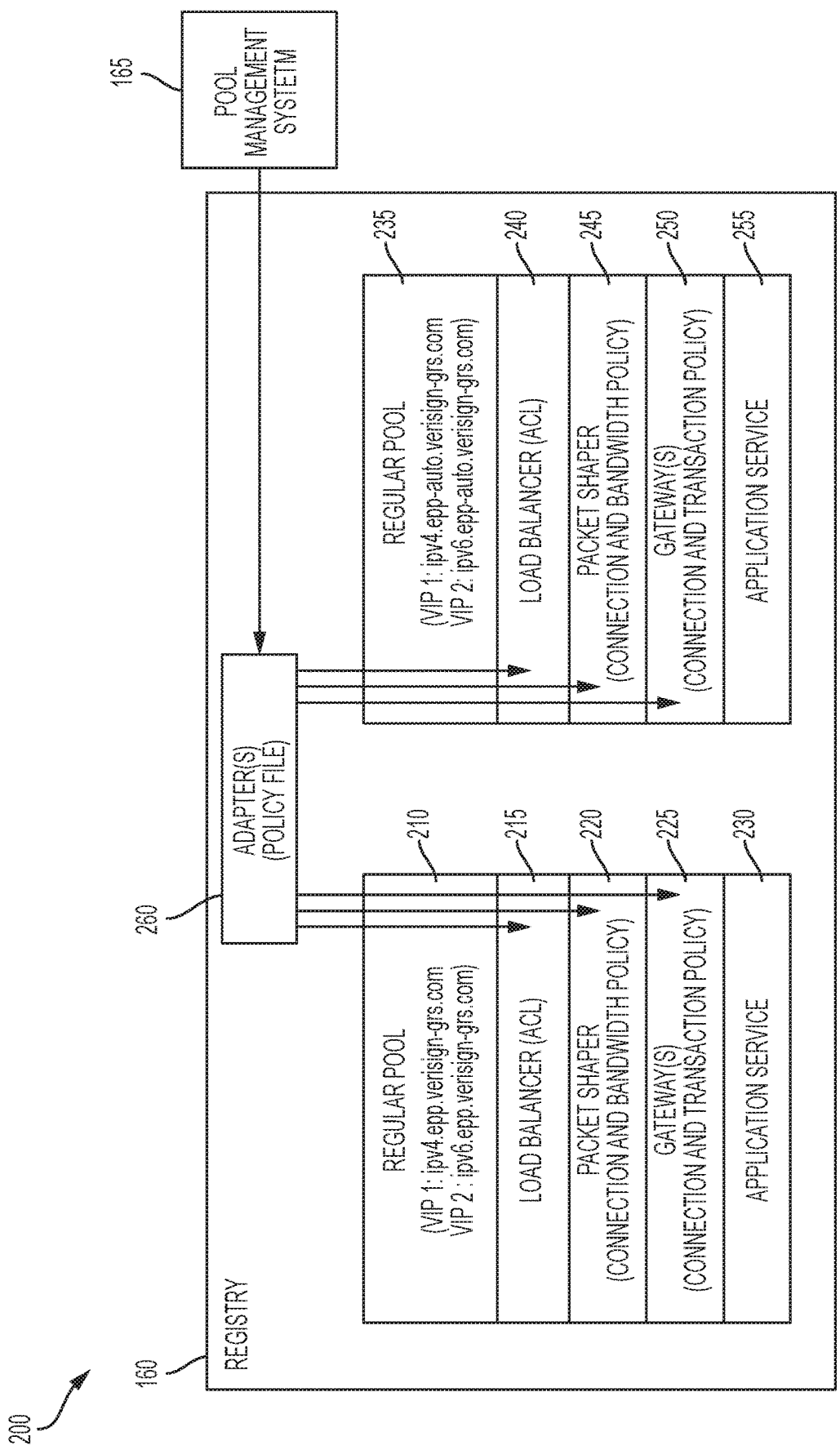
FIG. 2 shows components of the registry using the pool management system, according to examples of the present disclosure.

FIG. 2 showing the layers 200 of the domain registry 160 of connections and packets/transactions, according to examples of the present disclosure. The domain registry 160 comprises a regular pool 210 and an auto pool 235. The regular pool 210 can be accessed by the registrar 130, 150, using one or more domain names, e.g., VIP 1: ipv4.epp.verisign-grs.com or VIP 2: ipv6.epp.verisign-grs.com. Similarly, the auto pool 235 can be accessed by the registrar 130, 150, using one or more domain names, e.g., VIP 1: ipv4.epp-auto.verisign-grs.com or VIP 2: ipv6.epp-auto.verisign-grs.com. The regular pool 210 and the auto pool 235 can include a load balancer 215, 240 that can distribute network or application traffic across of number of servers of making up the respective pool using the ACL. The regular pool 210 and the auto pool 235 can include a packet shaper 220, 245 that can use a computer network traffic management technique to delay some or all datagrams to bring them into compliance with a desired traffic profile as provided by the policy. The regular pool 210 and the auto pool 235 can include one or more gateways 225, 250 that can bridge network traffic across networks using the policy. Although each pool is shown with the load balancer 215, 240, the packet shaper 220, 245, and the gateways 225, 250, one or more of the functions of each of these can be provided into a single device. The regular pool 210 and the auto pool 235 can include an application service, e.g., a pool management service component of the pool management system 165. The pool management system 165 provides one or more policies to one or more adapters 260 that modifies the one or more policies to be used by either the load balancer 215, 240, the packet shaper 220, 245, or the gateways 225, 250.

In operation, a connection from the registrar 130, 150 originates from an IP address included in the ACL of the load balancer 215, 240. A connection may be set so as to not exceed the connection policy provided in the network layers of the packet shaper 220, 245 or the gateways 225, 250. A request in the form of a packet or transaction will be slowed if it exceeds the bandwidth policy in the network layer of the packet shaper 220, 245 or the transaction policy in network layer of the gateways 225, 250. A request is forwarded to the networking layer of the application service layer 230, 255 for processing and providing a result.

In examples, ACLs, connection policies, bandwidth policies, and transaction policies can be managed and automated on a per network pool and per registrar basis. The pools are provided and linked to the systems and registrars, and the pool policies need to be generated by a service responsible for it, e.g., the pool management service 305. The pool can limit activity by applying a bandwidth policy and/or a transaction policy based on the network equipment deployed. The pool management service 305 has access to the account, subscription, and system information from the authoritative account data source, and has its own data source for defining the network pools and their policies.

Figure 3:
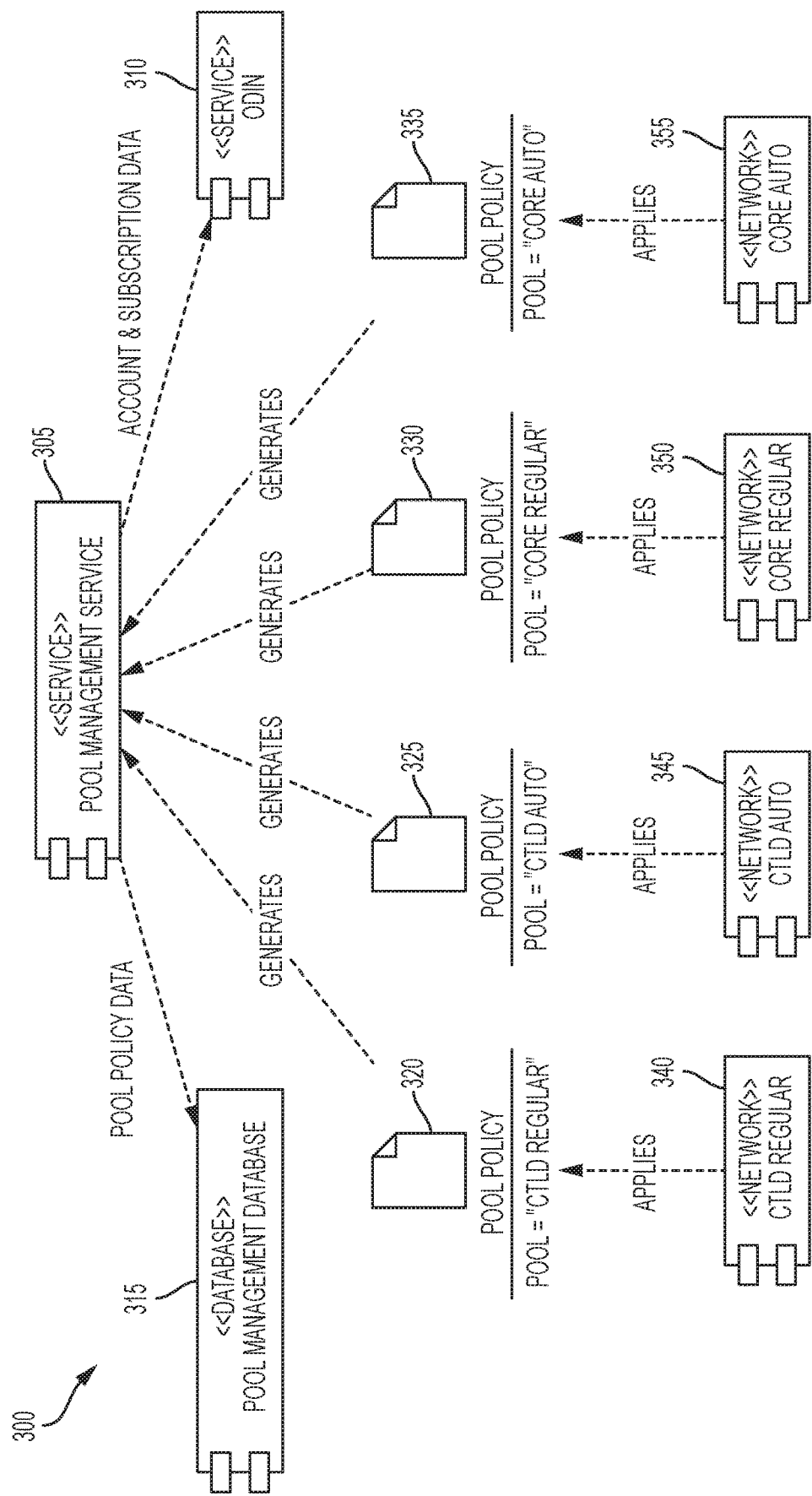
FIG. 3 shows a component diagram of a pool management service along with its dependencies (account database and pool management database), the pool policy files generated for two systems (CTLD and core) with two pools each (regular and auto), according to examples of the present disclosure.

FIG. 3 shows a diagram 300 of a pool management service 305 along with its dependencies (account database 310 and pool management database 315), the pool policy files 320, 325, 330, 335 generated for two systems (CTLD and core) with two pools each (regular and auto), according to examples of the present disclosure. Each pool includes the layers described above in FIG. 2. In this example, the core represents a core registry for .com/.net TLDS, which are managed on a common platform. The CTLD (common TLD) represents a registry for other TLDs, such as gTLDS that are not .com or .net. The pool management service 305 provides the administration tools used to provide and manage the network pool policies. The account database 310 provides account information including the IP ranges, the account subscription information including the account to product (TLDs) privileges, and the association of products (TLDs) to systems that are provided in the account database 310 and linked to the pool policy. The pool management database 315 provides pool policy data to the pool management service 305. The CTLD regular network appliance 340 applies the pool policy file 320, which is generated by the pool management service 305. The CTLD auto network appliance 345 applies the pool policy file 325, which is generated by the pool management service 305. The core regular network appliance 350 applies the pool policy file 330, which is generated by the pool management service 305. The core regular auto appliance 355 applies the pool policy file 335, which is generated by the pool management service 305 A standard pool policy file format is provided and used to generate the ACL, connection, bandwidth, and transaction policy for each pool. The network appliances are load balancer 215, 240, the packet shaper 220, 245, or the gateways 225, 250. The network team can create adapters to apply the pool policy to the network equipment. The flow of defining the policies, generating the pool policy files, and applying the pool policy files to the appropriate network equipment can be fully automated.

The elements that provide the registrar's access to the any pool is based the following pool properties. First, maximum pool connections—what is the maximum number of connections available in the pool? The pool can be over allocated to support at least the number of connections per account multiplied by the number of account connections. Second, maximum pool bandwidth—what is the maximum bandwidth for the entire pool in megabits per second (mbps)? Third, maximum pool transactions—what is the maximum transactions for the entire pool per second (tps)? Fourth, connections per account—how many connections does a subscribed account get to the pool? Fifth, bandwidth per account—what is the maximum bandwidth per account to the pool? Sixth, transactions per account—what is the maximum number of transactions per second (tps) per account to the pool?

The pool properties are combined with the account IP ranges and relationship of the accounts to the systems based on the provided product subscriptions. The IP ranges of accounts that have at least one product subscription to a system, will be included in the ACL's for the system network pools. Any account that has at least one product subscription to a system, will then be included in the per account connection, bandwidth, and transaction policy based on their unique IP ranges. There can be an override provided for exceptional cases, like when a registrar requests for additional connections, bandwidth, and transactions for the load associated with high demand promotional event. The pool management service can be directly merged into the account service provided by the account database 310 or can be separated based on the option of implementing pool slots as discussed further below.

The conventional model of enabling access to system network pools based on number of account to system subscriptions provides an incentive for registrars to create more shell registrar accreditations with ICANN and requires registries to setup additional separate accounts and account subscriptions. This conventional model does not scale and provides a great amount of additional overhead for the registrars and for registries to solve the problem of providing additional access to the network pools. The network pool where registrars want additional access is the Batch (Auto) Pool.

An improved model is to enable registrars to purchase pool slots from a registry to the desired network pool, where the connection and bandwidth policies of the pool are not driven by accounts but are driven by slots. This means that pool slots may be subscription based and may be billable, so having a separate pool management service 305 can be useful. The pool management service 305 provided above can be extended to support pool slots to provide the connection and bandwidth policies for the pools. Because the pool management service 305 is defining the policy and generating the same pool policy file format, nothing needs to change from a network perspective.

Figure 4:
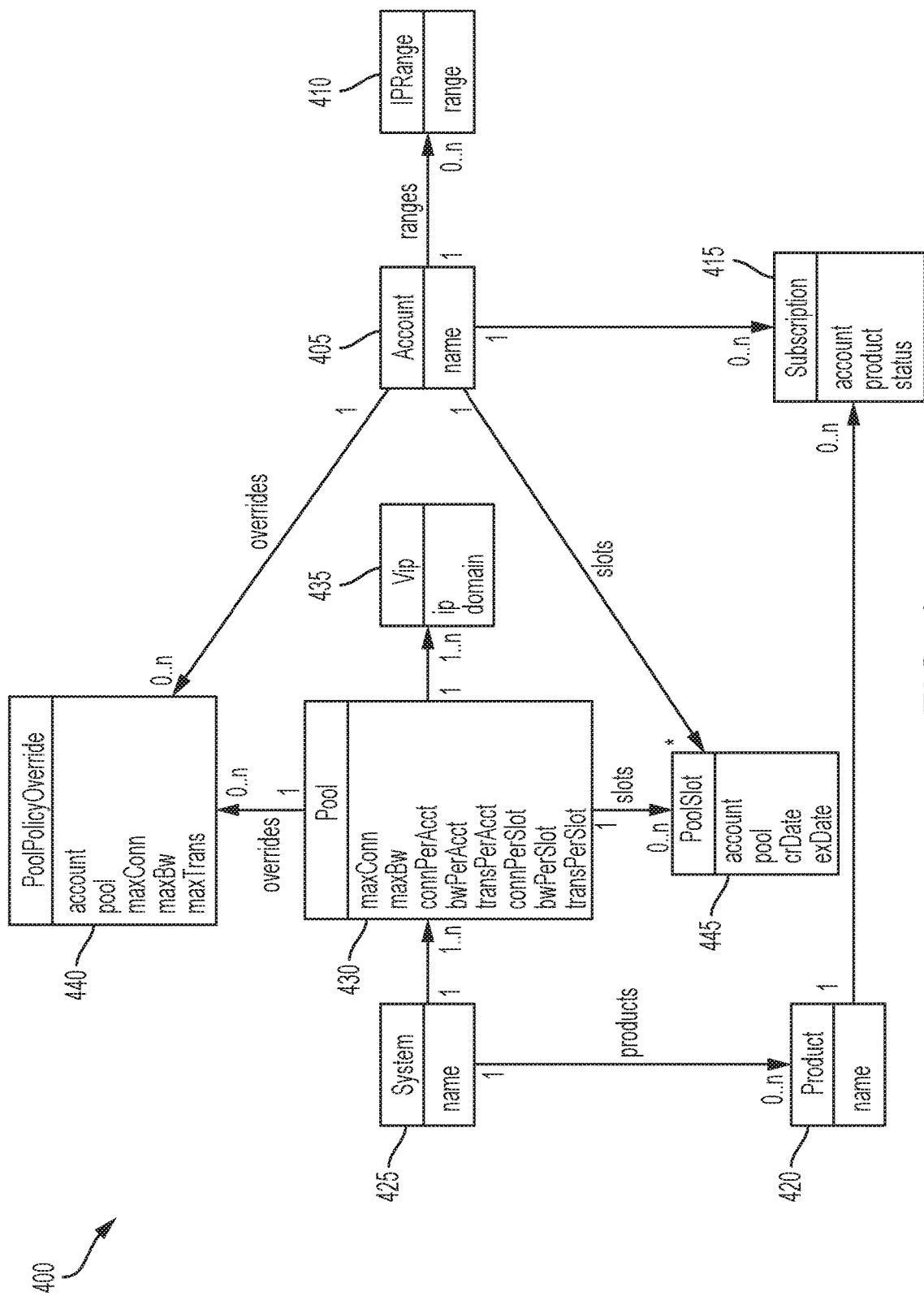
FIG. 4 show a pool slots class diagram that supports both the per account policy as well as the per slot policy of supporting pool slots, according to examples of the present disclosure.

FIG. 4 shows a pool slots class diagram 400 that supports both the per account policy provided in the pool management service discussed above as well as the per slot policy of supporting pool slots, according to examples of the present disclosure. The pool slots class diagram 400 provides the classes that come from the account database 310, classes specific to the pool management service 305 used to provide the pools and the pool policies on a per account basis, and a new class used to support pool slots. Not all dependent classes are represented and not all class attributes are represented. Below is a description of each of the classes in the FIG. 4:

An Account class ("Account") 405 is an existing class that contains the attributes associated with an Account like the name, address, e-mail addresses, URL, and other information. Additional classes associated with the Account 405 are not represented in FIG. 4 like user, contact, and billing related classes.

An IPRange class ("IPRange") 410 is an existing class that represents the IP ranges for an account. There is a one to many relationship between the Account and the IPRange. The aggregate set of IPRange instances for an Account 405 makeup the account ACL entries as well as mapping the connection and bandwidth policies.

A subscription class ("Subscription") 415 is an existing class that links the Accounts 405 to Product 420. The Subscription class 415 includes a many to one relationship to an Account 405 and to a Product class ("Produce") 420.

The Product 420 is an existing class that provides a system Product 420 like a TLD. A Product 420 can have many Account Subscriptions and can be associated with one System.

A System class ("System") 425 is a new class that provides a system. The System class 425 is related to many Products 420 like TLDs and has one or more Pool 430.

A Pool class ("Pool") 430 is a new class that provides a network pool linked to a System 425 and linked to one or more Vips 435. For a per account pool policy, following the path Pool 430 to System 425 to Products 420 to Subscriptions 415 to Accounts 405 and finally to the IPRanges 410 will provide the IP ranges used for the ACL, as well as the IP ranges to assign to the per account connection, bandwidth, and transaction policy. The Pool 430 has attributes including one or more of the following: maximum connections (maxConn), maximum bandwidth (maxBw), connections per account (connPerAcct), bandwidth per account (bwPerAcct), transactions per account (transPerAcct), connections per slot (connPerSlot), and transactions per slot (transPerSlot). The Pool 430 can limit activity by applying a bandwidth policy and/or a transaction policy based on the network equipment deployed. Exceptional per account pool policies can be provided by a PoolPolicyOverride class 440. For a per slot policy, following the path Pool 430 to PoolSlots 445 to Account 405 and finally to IPRanges 410 will provide the IP ranges used for the ACL, as well as the IP ranges to assign to the aggregate connections and bandwidth policy based on the number of slots. A hybrid pool policy can be used where both the per account policy applies and the per slot policy is used to purchase more slots of access as an alternative to use the PoolPolicyOverride 440.

A Vip class ("Vip") 435 is a new class that provides a Vip (domain and IP address) assigned to a pool. There can be multiple Vips assigned to a pool, like having a V4 and V6 Vip that needs to have an aggregate policy applied.

A PoolPolicyOverride class ("PoolPolicyOverride") 440 is a new class that provides the ability to override the default per account policy for exceptional cases like a registrar getting additional connections, bandwidth, and transactions to support a high demand advertising campaign. The PoolPolicyOverride 440 has attributes including one or more of the following: account, pool, maximum connections (maxConn), maximum bandwidth (maxBw), and maximum transactions (maxTrans). The PoolPolicyOverride 440 is provided per Pool 430 and is associated with an individual Account 405. An Account 405 can have many PoolPolicyOverride 440 instances, since they may need to have overrides in multiple Pools 430.

A PoolSlot class ("PoolSlot") 445 is a new class that represents a slot of access to a Pool. The Pool provides the number of connections and the bandwidth allocated per slot, and the PoolSlot represents allocated slots to Accounts. An Account can have PoolSlots that can be allocated in many ways including by purchasing them. A PoolSlot can be a subscription based service with a creation date (crDate) and an expiration date (exDate).

Figure 5:
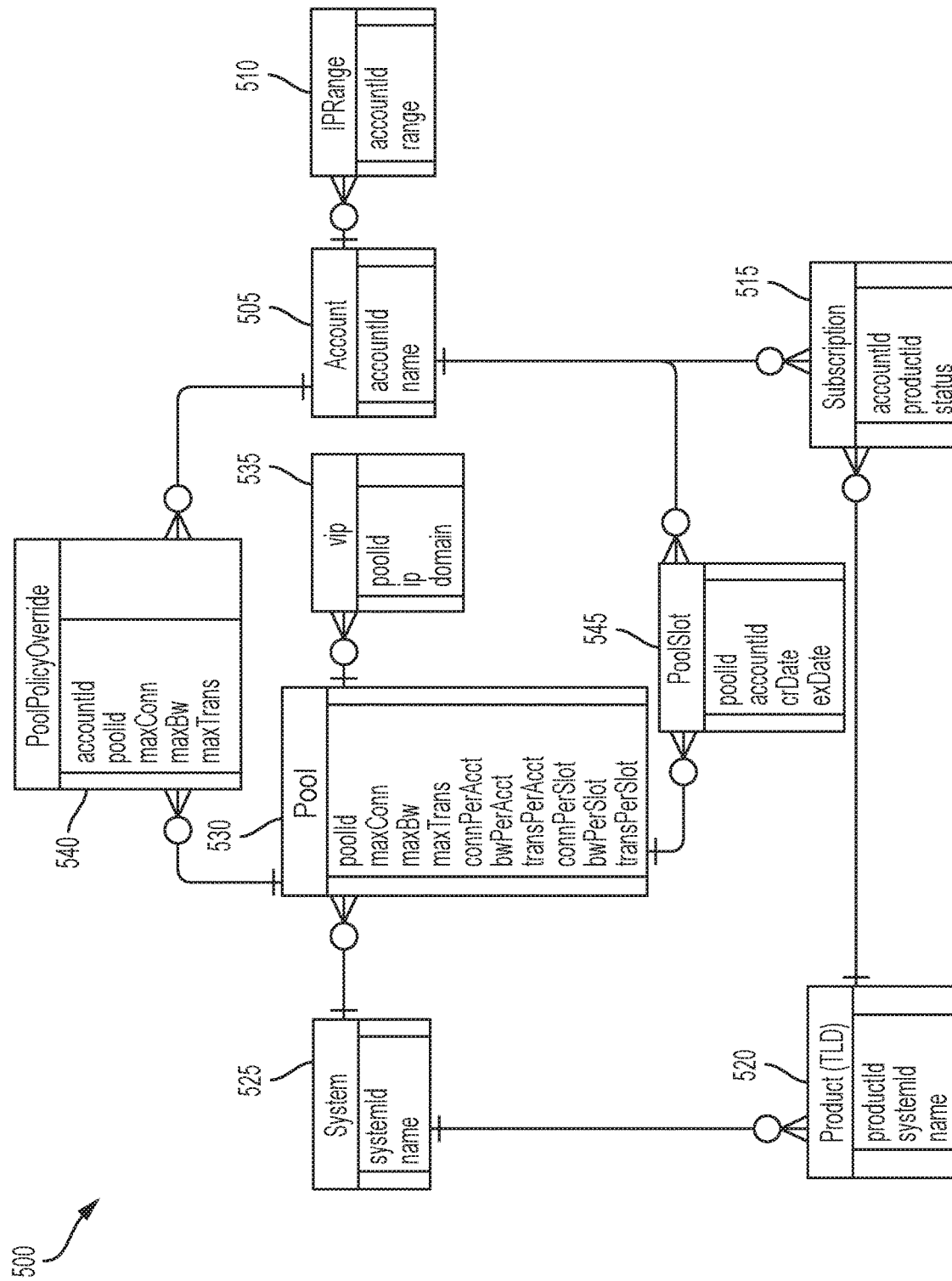
FIG. 5 shows a pool slots entity relationship (ER) diagram that is a data model representation of the pool slots class diagram, according to examples of the present disclosure.

FIG. 5 shows a pool slots entity relationship (ER) diagram 500 that is a data model representation of the pool slots class diagram 400 that can be used as the pool management database 315 to create a database schema to store the associated data. The ER diagram 500 is similar to the pool slots class diagram 400 in that it does not contain all of the tables and all of the attributes. The ER diagram 500 only the important tables and relationships to understand the makeup of the data model. Similar to FIG. 4, an account 505, e.g., an account for a registrar, has one or more associated IP address ranges represented by IPRange 510. The account 505 has one or more subscriptions 515 for a product 520, e.g., a TLD. A system 525, e.g., CTLD or core, is associated with one or more products 520. A system 525 is associated with one or more pools 530, e.g., regular or batch. A pool 530 is associated with one or more pool policy override (PoolPolicyOveride) 540, one or more pool slots (PoolSlot) 545, and one or more VIPs 535, e.g., domain names for v4 or v6. An account 505 is associated with one or more pool policy override (PoolPolicyOveride) 540 and one or more pool slots (PoolSlot) 545. With the pool management service 305 support for pool slots, a pool can be initially setup using a per account policy and some pool policy overrides to support the existing pool policies, then setup a hybrid per account and per slot policy that enables allocation of additional pool slots, and finally a full transition of a per slot policy. The front end definition of the connections and bandwidth per account or per slot result in an aggregate number of connections and bandwidth being assigned to a set of IP ranges associated with an Account, so the same Pool Policy files can be generated and applied to the network equipment. This low coupling between the policy management and the network equipment, enables new and unique approaches to be taken in managing the pool policies. Whether pool slots are automated allocated, purchased, or used simply as a mechanism to override the default policy, they provide a high level of flexibility.

Figure 6:
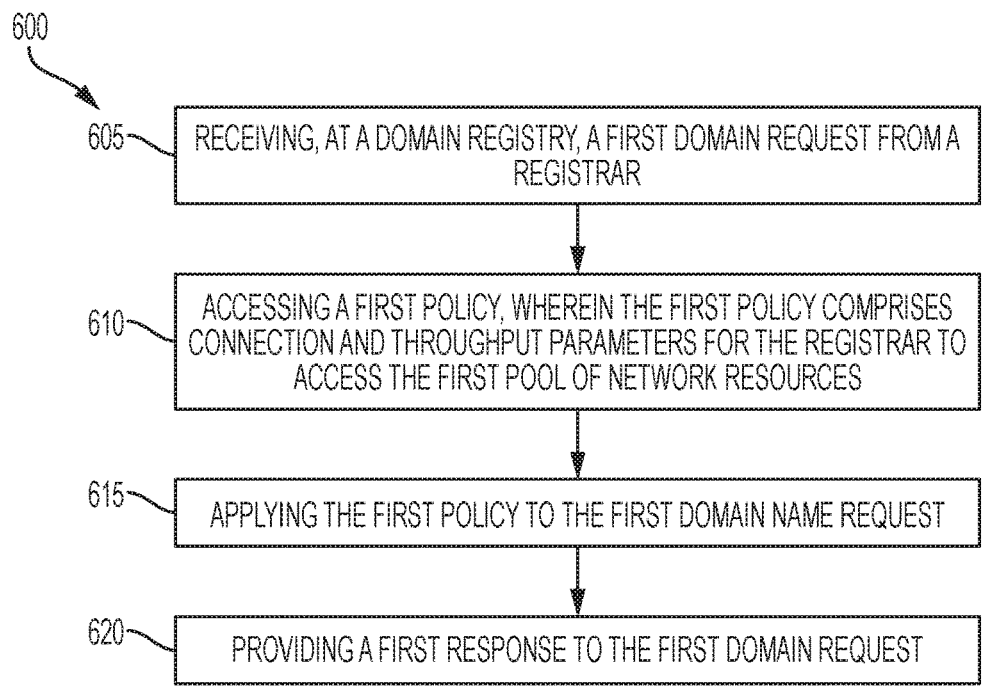
FIG. 6 shows a method for pool management, according to examples of the present disclosure.

FIG. 6 shows a method 600 for providing domain registry services, according to examples of the present disclosure. The method 600 begins by receiving, at 605, at a domain registry, a first domain request from a registrar. The first domain request comprises a first extensible provisioning protocol ("EPP") command to perform a first action on a first domain name associated with a first pool of network resources. The method 600 continues by accessing, at 610, a first policy. The first policy comprises connection and throughput parameters for the registrar to access the first pool of network resources. In some examples, the accessing can include loading a policy file from a pool management service, wherein the policy file comprises the first policy, the second policy, or both the first policy and the second policy. The connection and throughput parameters comprise one or more of: maximum connections, maximum transaction, maximum bandwidth, connections per account, transactions per account, connections per slot, transactions per slot, bandwidth per slot, and bandwidth per account. In some examples, the first policy is based on one or more slots, wherein the connection and throughput parameters comprise a number of connections, a bandwidth allocation and/or a transaction throughput allocation.

The method 600 continues by applying, at 615, the first policy to the first domain name request. In some examples, the first policy can be applied by adapting the first policy file to a configuration to be used by a network layer of the first pool of network resources. In some examples, the first policy can be applied with the use of a remote interface or API. Based on the policy that is applied, the first domain request can be accepted, throttled, or rejected based on the first policy that is applied. The method 600 concludes by providing, at 620, a first response to the first domain request.

In some examples, the domain registry can obtain a second domain request from the registrar. The second domain request comprises a second EPP command to perform a second action on a second domain name associated with a second pool of network resources. The domain registry can then access a second policy. The second policy comprises connection and throughput parameters that are different than the first policy for the registrar to access the second pool of network resources. The domain registry can then apply the second policy to the second domain request. The domain registry can then provide a second response to the second domain request.

Figure 7:
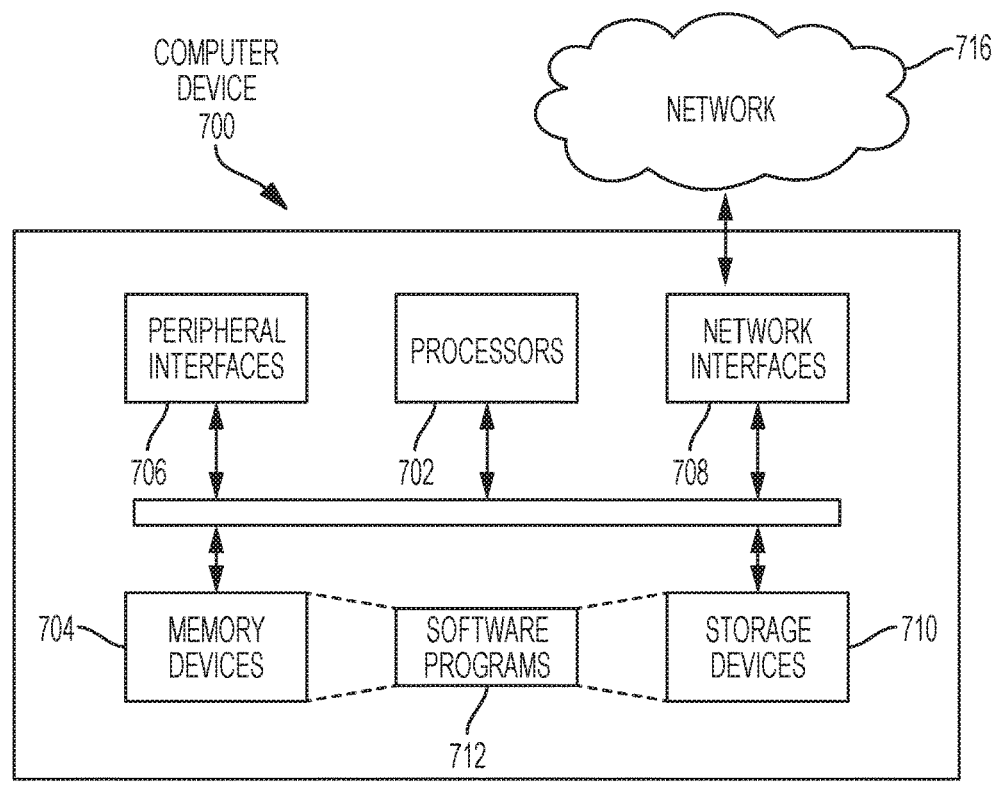
FIG. 7 is an example computer system for performing the disclosed implementations, consistent with the present disclosure.

FIG. 7 illustrates an example of a hardware configuration for a computer device 700 that can be used as mobile device or server, which can be used to perform one or more of the processes described above. While FIG. 7 illustrates various components contained in the computer device 700, FIG. 7 illustrates one example of a computer device and additional components can be added and existing components can be removed.

The computer device 700 can be any type of computer devices, such as desktops, laptops, servers, DNS server, etc., or mobile devices, such as smart telephones, tablet computers, cellular telephones, personal digital assistants, etc. As illustrated in FIG. 7, the computer device 700 can include one or more processors 702 of varying core configurations and clock frequencies. The computer device 700 can also include one or more memory devices 704 that serve as a main memory during the operation of the computer device 700. For example, during operation, a copy of the software that supports the domain registry operations can be stored in the one or more memory devices 704. The computer device 700 can also include one or more peripheral interfaces 706, such as keyboards, mice, touchpads, computer screens, touchscreens, etc., for enabling human interaction with and manipulation of the computer device 700.

The computer device 700 can also include one or more network interfaces 708 for communicating via one or more networks, such as Ethernet adapters, wireless transceivers, or serial network components, for communicating over wired or wireless media using protocols. The computer device 700 can also include one or more storage device 710 of varying physical dimensions and storage capacities, such as flash drives, hard drives, random access memory, etc., for storing data, such as images, files, and program instructions for execution by the one or more processors 702.

Additionally, the computer device 700 can include one or more software programs 712 that enable the functionality described above. The one or more software programs 712 can include instructions that cause the one or more processors 702 to perform the processes described herein. Copies of the one or more software programs 712 can be stored in the one or more memory devices 704 and/or on in the one or more storage devices 710. Likewise, the data used by one or more software programs 712 can be stored in the one or more memory devices 704 and/or on in the one or more storage devices 710.

In implementations, the computer device 700 can communicate with other devices via a network 716. The other devices can be any types of devices as described above. The network 716 can be any type of electronic network, such as a local area network, a wide-area network, a virtual private network, the Internet, an intranet, an extranet, a public switched telephone network, an infrared network, a wireless network, and any combination thereof. The network 716 can support communications using any of a variety of commercially-available protocols, such as TCP/IP, UDP, OSI, FTP, UPnP, NFS, CIFS, AppleTalk, and the like. The network 716 can be, for example, a local area network, a wide-area network, a virtual private network, the Internet, an intranet, an extranet, a public switched telephone network, an infrared network, a wireless network, and any combination thereof.

The computer device 700 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 700 as described above need not be enclosed within a single enclosure or even located in close proximity to one another. Those skilled in the art will appreciate that the above-described componentry are examples only, as the computer device 700 can include any type of hardware componentry, including any necessary accompanying firmware or software, for performing the disclosed implementations. The computer device 700 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A method for providing domain registry services comprising:
receiving, at a domain registry comprising at least one electronic server computer, a first domain request from a registrar, wherein the first domain request comprises a first extensible provisioning protocol ("EPP") command to perform a first action on a first domain name associated with a first pool of network resources;
determining that an electronically stored first policy from a set of policies corresponds to the first pool of network resources;
accessing, by at least one electronic processor, the first policy, wherein the first policy comprises connection and throughput parameters for the registrar to access the first pool of network resources, wherein the connection and throughput parameters comprise at least two or more of: a maximum connection , a maximum transaction, a maximum bandwidth, a connection per account, a connection per slot, a transaction per slot, a bandwidth per slot, a bandwidth per account, a number of connections, a bandwidth allocation, or a transaction throughput allocation;
applying, by at least one electronic processor, the first policy to the first domain name request; and
providing, by at least one electronic processor, a first response to the first domain request.

2. The method of claim 1, further comprising:
receiving, at the domain registry, a second domain request from the registrar, wherein the second domain request comprises a second EPP command to perform a second action on a second domain name associated with a second pool of network resources;
accessing a second policy, wherein the second policy comprises a connection and throughput parameter that is different than at least one of the connection and throughput parameters of the first policy for the registrar to access the second pool of network resources;
applying the second policy to the second domain request; and
providing a second response to the second domain request.

3. The method of claim 1, wherein the first domain request is accepted, throttled, or rejected based on the first policy that is applied.

4. The method of claim 2, wherein the accessing comprises loading a policy file from a pool management service, wherein the policy file comprises the first policy, the second policy, or both the first policy and the second policy.

5. The method of claim 4, further comprising adapting the policy file to a configuration to be used by a network layer of the first pool of network resources.

6. The method of claim 1, wherein applying the first policy further comprises applying the first policy with the use of a remote interface or API.

7. The method of claim 1, wherein the first pool of network resources are configured to provide equivalent or premium access to registrars.

8. The method of claim 1, wherein the first policy is based on one or more slots.

9. A system for providing domain registry services comprising:
at least one processor;
a computer readable medium configured to store instructions, that when executed by the at least one processor, perform a method comprising:
receiving, at a domain registry comprising at least one electronic server computer, a first domain request from a registrar, wherein the first domain request comprises a first extensible provisioning protocol ("EPP") command to perform a first action on a first domain name associated with a first pool of network resources;
determining that an electronically stored first policy from a set of policies corresponds to the first pool of network resources;
accessing, by at least one electronic processor, the first policy, wherein the first policy comprises connection and throughput parameters for the registrar to access the first pool of network resources, wherein the connection and throughput parameters comprise at least two or more of: a maximum connection , a maximum transaction, a maximum bandwidth, a connection per account, a connection per slot, a transaction per slot, a bandwidth per slot, a bandwidth per account, a number of connections, a bandwidth allocation, or a transaction throughput allocation;
applying, by at least one electronic processor, the first policy to the first domain name request; and
providing, by at least one electronic processor, a first response to the first domain request.

10. The system of claim 9, wherein at least one processor is configured to perform the method further comprising:
receiving, at the domain registry, a second domain request from the registrar, wherein the second domain request comprises a second EPP command to perform a second action on a second domain name associated with a second pool of network resources;
accessing a second policy, wherein the second policy comprises a connection and throughput parameter that is different than at least one of the connection and throughput parameters of the first policy for the registrar to access the second pool of network resources;
applying the second policy to the second domain request; and
providing a second response to the second domain request.

11. The system of claim 9, wherein the first domain request is accepted, throttled, or rejected based on the first policy that is applied.

12. The system of claim 10, wherein the accessing comprises loading a policy file from a pool management service, wherein the policy file comprises the first policy, the second policy, or both the first policy and the second policy.

13. The system of claim 12, wherein the at least one processor is configured to perform the method further comprising adapting the policy file to a configuration to be used by a network layer of the first pool of network resources.

14. The system of claim 9, wherein applying the first policy further comprises applying the first policy with the use of a remote interface or API.

15. The system of claim 9, wherein the first pool of network resources are configured to provide equivalent or premium access to registrars.

16. The system of claim 9, wherein the first policy is based on one or more slots.

17. A non-transitory computer readable medium configured to store instructions, that when executed by at least one processor, performs a method comprising:
receiving, at a domain registry comprising at least one electronic server computer, a first domain request from a registrar, wherein the first domain request comprises a first extensible provisioning protocol ("EPP") command to perform a first action on a first domain name associated with a first pool of network resources;

determining that an electronically stored first policy from a set of policies corresponds to the first pool of network resources;

accessing, by at least one electronic processor, the first policy, wherein the first policy comprises connection and throughput parameters for the registrar to access the first pool of network resources, wherein the connection and throughput parameters comprise at least two or more of: a maximum connection, a maximum transaction, a maximum bandwidth, a connection per account, a connection per slot, a transaction per slot, a bandwidth per slot, a bandwidth per account, a number of connections, a bandwidth allocation, or a transaction throughput allocation;

applying, by at least one electronic processor, the first policy to the first domain name request; and providing, by at least one electronic processor, a first response to the first domain request.

18. The non-transitory computer readable medium of claim 17, further comprising:

receiving, at the domain registry, a second domain request from the registrar, wherein the second domain request comprises a second EPP command to perform a second action on a second domain name associated with a second pool of network resources;

accessing a second policy, wherein the second policy comprises a connection and throughput parameter that is different than at least one of the connection and throughput parameters of the first policy for the registrar to access the second pool of network resources;

applying the second policy to the second domain request; and providing a second response to the second domain request.

19. The method of claim 1, wherein the first policy provides different connection capabilities for registrars accessing a core domain.

20. The method of claim 2, wherein the second pool of network resources corresponds to a generic top-level domain that excludes a .com domain, and wherein the second policy enables the registrar to manage the generic top-level domain.

* * * * *